United States Patent [19]

Hooser

[11] Patent Number: 5,115,845
[45] Date of Patent: May 26, 1992

[54] PORTABLE STUMP REMOVER

[76] Inventor: Steven M. Hooser, 1 South 726 Ott Ave., Glen Ellyn, Ill. 60137

[21] Appl. No.: 693,661

[22] Filed: Apr. 30, 1991

Related U.S. Application Data

[63] Continuation-in-part of Ser. No. 688,991, Apr. 23, 1991, Pat. No. 5,034,407, which is a continuation of Ser. No. 573,107, Aug. 28, 1990, abandoned, which is a continuation of Ser. No. 466,462, Jan. 16, 1990, abandoned.

[51] Int. Cl.$^5$ .......................... A01G 23/06; B02C 1/04
[52] U.S. Cl. ...................... 144/2 N; 37/2 R; 144/208 C; 144/231; 144/241
[58] Field of Search ............... 144/2 N, 218, 231, 241, 144/208 R, 208 C; 37/2 R; 241/101.7, 168, 169.1, 278 R, 294, 296

[56] References Cited

U.S. PATENT DOCUMENTS 4,697,625 10/1987 Bolton .......................... 144/2 N

*Primary Examiner*—W. Donald Bray
*Attorney, Agent, or Firm*—Dressler, Goldsmith, Shore, Sutker & Milnamow

[57] ABSTRACT

A portable, self-contained stump remover, that may be hand held by the operator, has an engine driven cutting device with chisel elements which rotate through a circular path. The chisel elements may be laterally offset, and the stump remover may also have a pivot member for engaging a tree stump when the stump remover is placed on the stump by the operator. The stump remover can be pivoted across the stump in a plane substantially parallel to the stump surface to effect comminution of the stump.

30 Claims, 14 Drawing Sheets

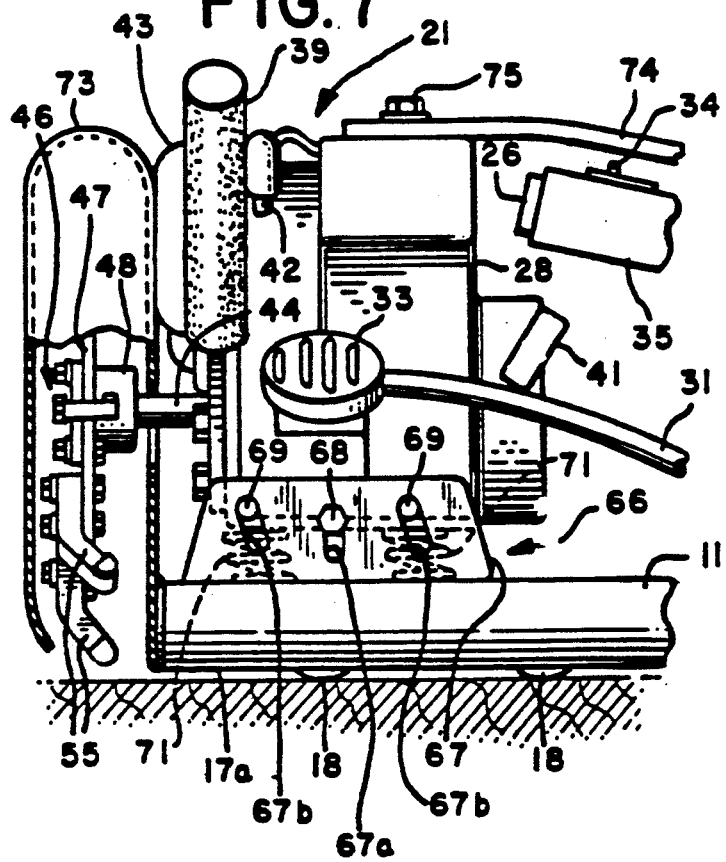
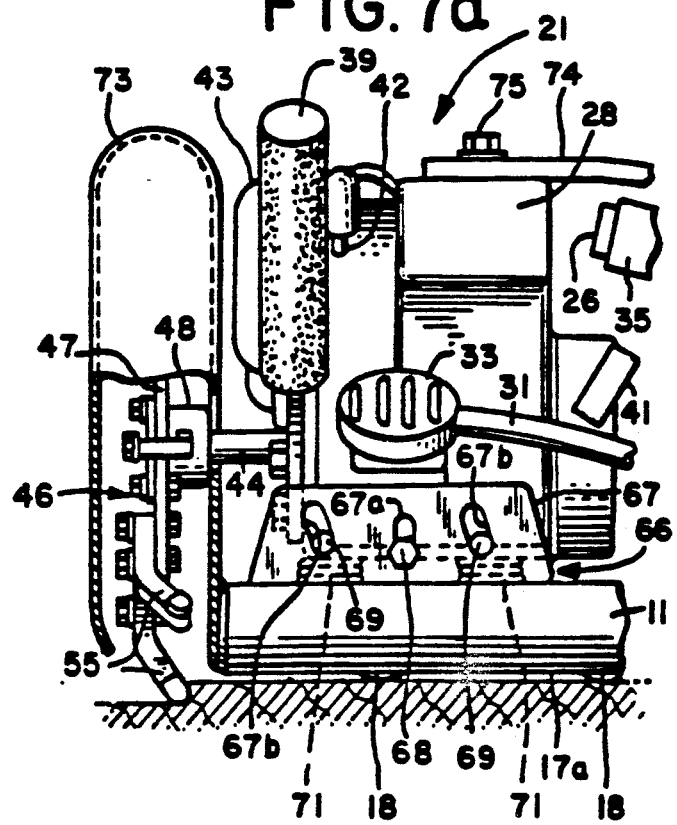

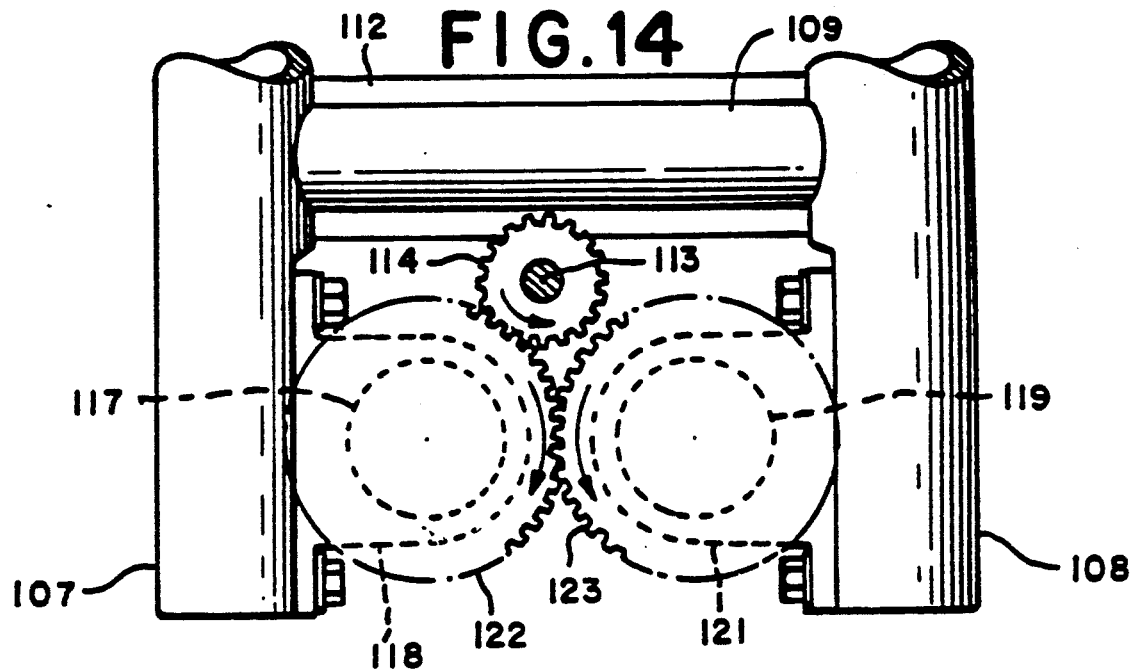
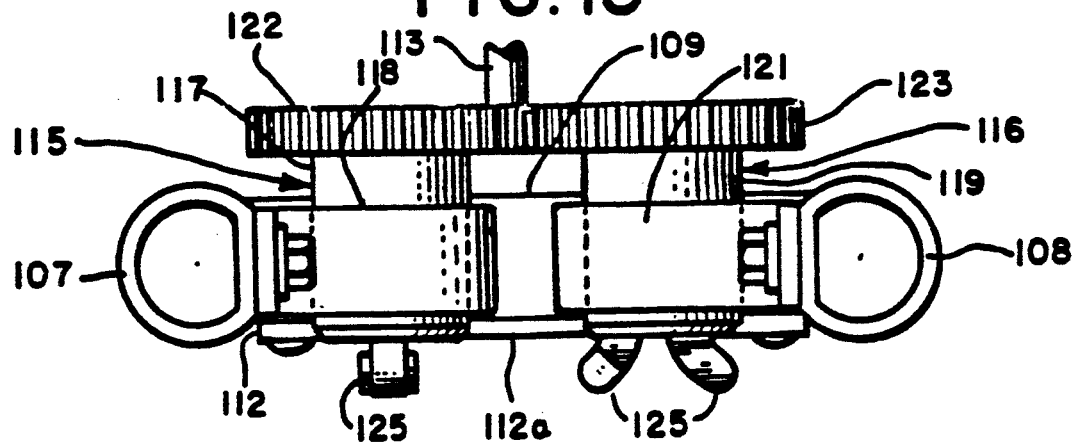

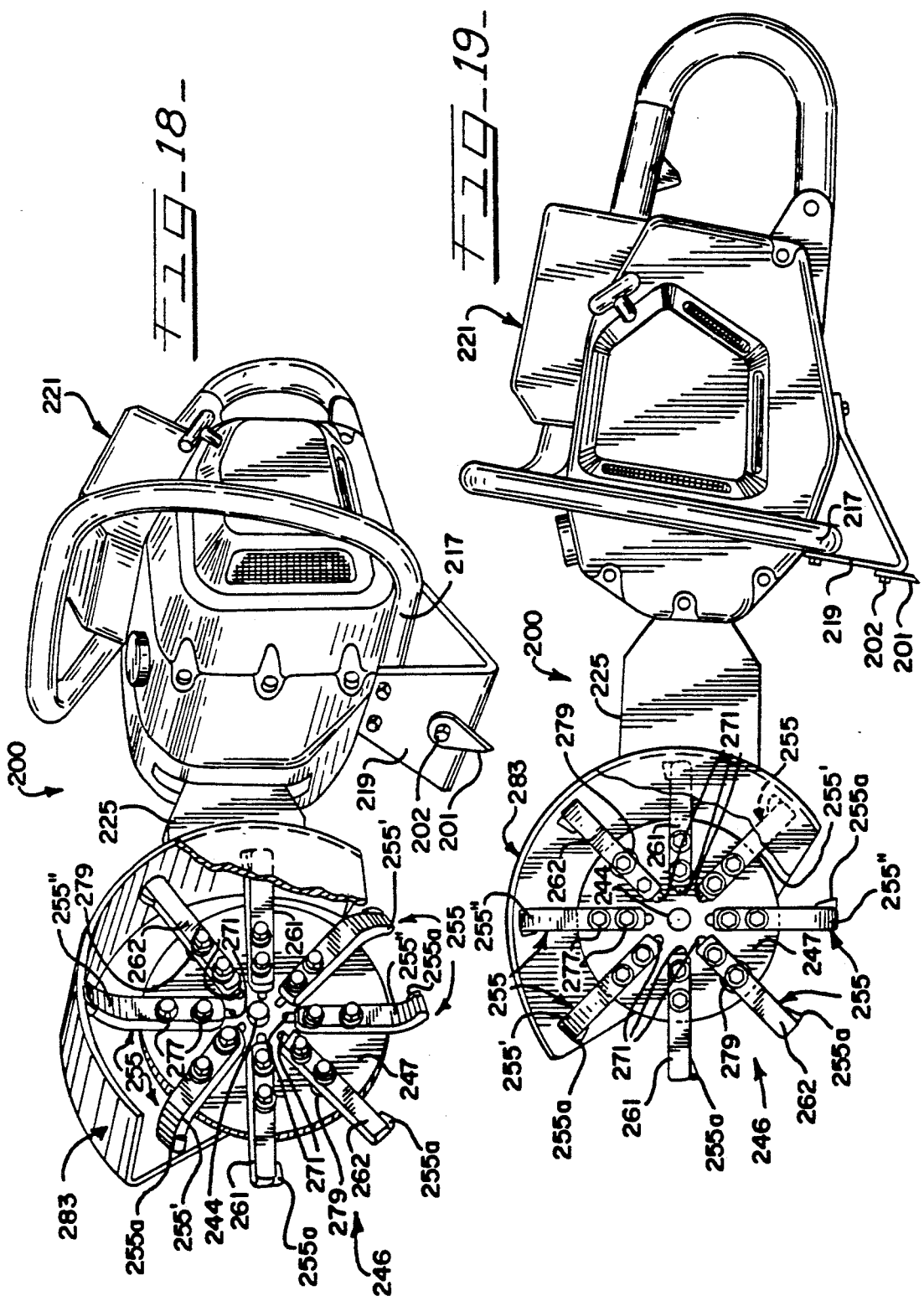

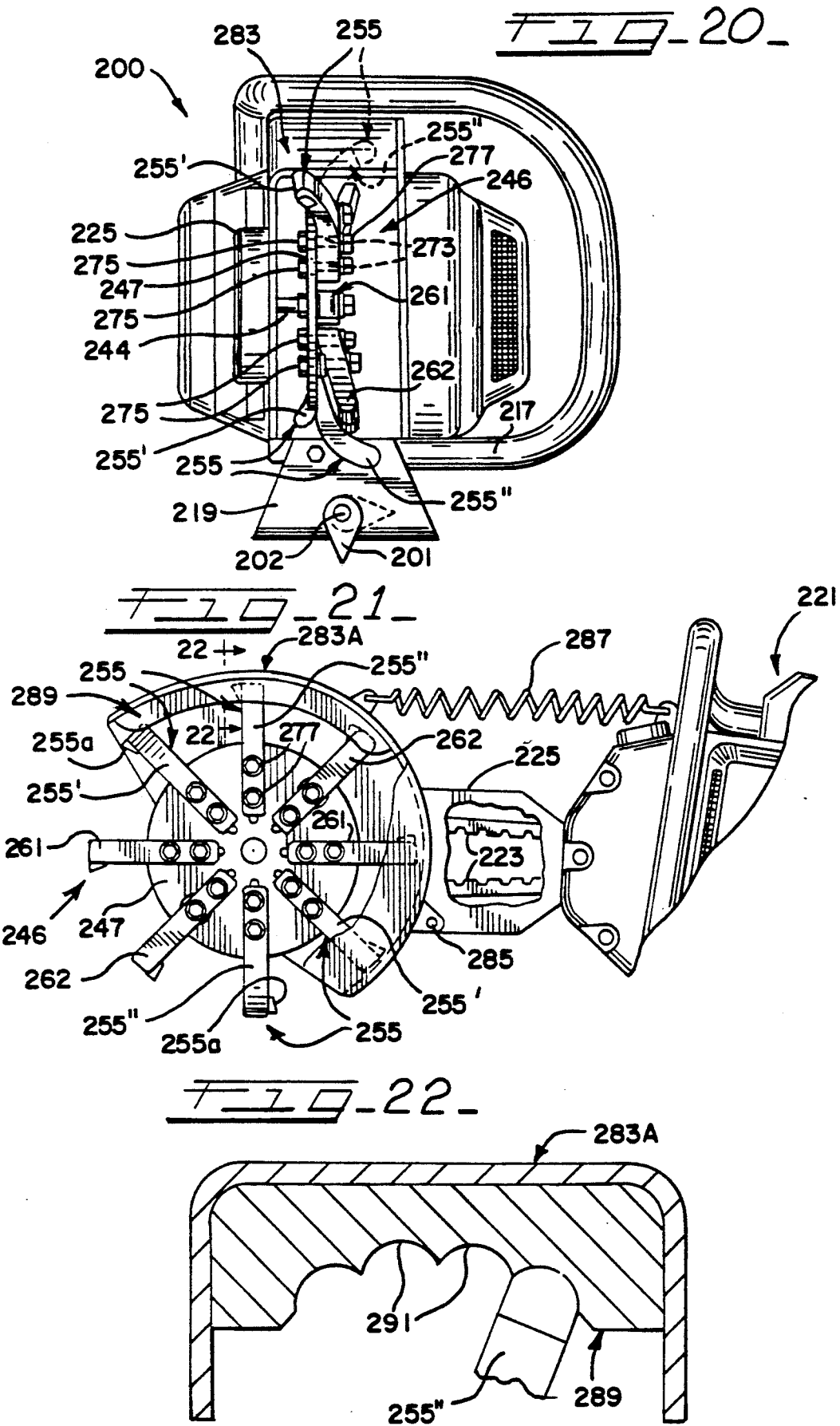

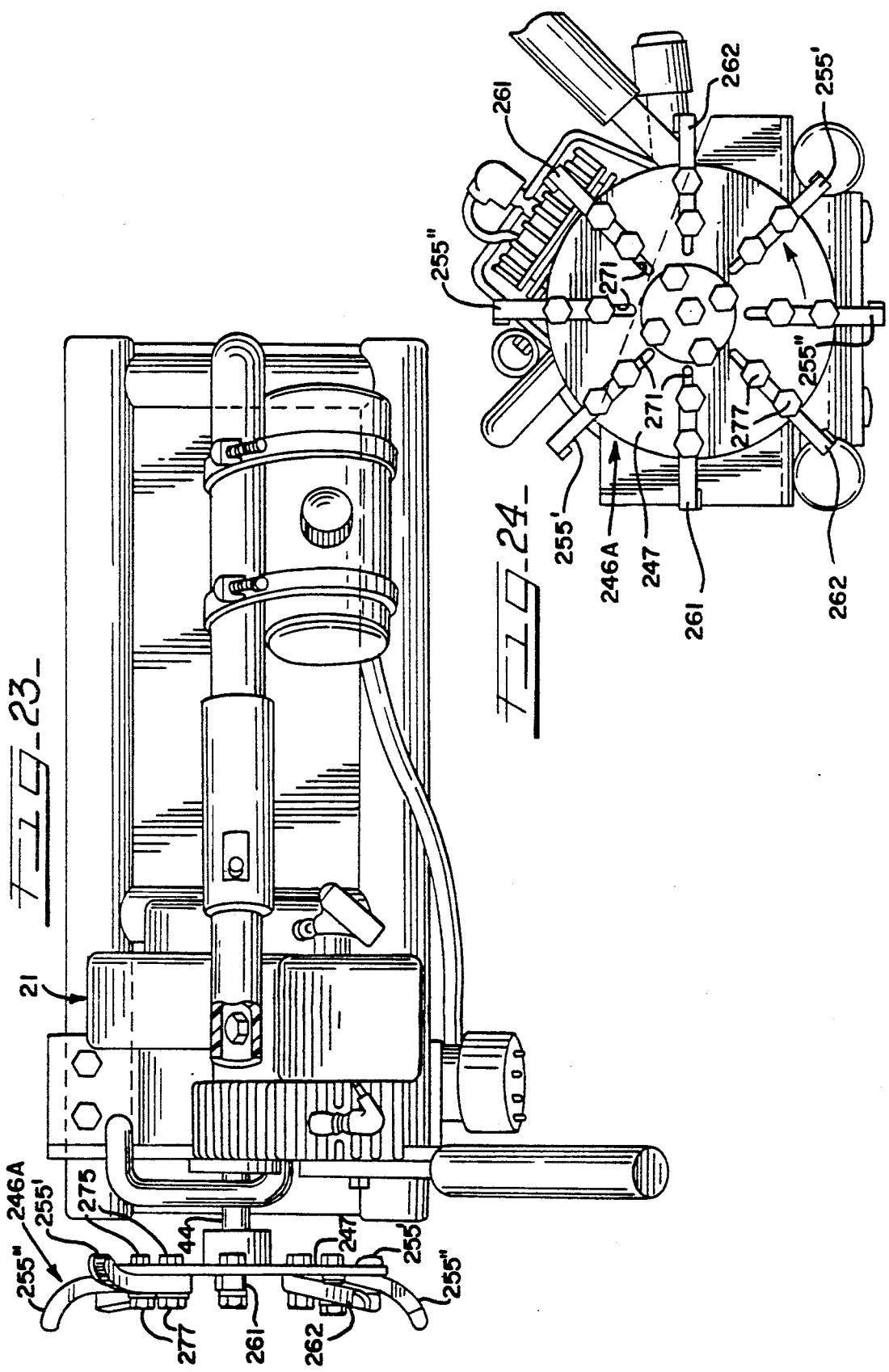

PORTABLE STUMP REMOVER

CROSS-REFERENCE TO RELATED APPLICATIONS

This application is a continuation-in-part patent application of copending U.S. Pat. application Ser. No. 07/688,991, now U.S. Pat. No. 5,034,407 filed by Steven M. Hooser on Apr. 23, 1991, which is a continuation of U.S. Pat. application Ser. No. 07/573,107, filed on Aug. 28, 1990, now abandoned, and which, in turn, is a continuation of U.S. Pat. application Ser. No. 07/466,462 filed on Jan. 16, 1990, now abandoned.

TECHNICAL FIELD

This invention relates generally to apparatus for removing tree stumps and roots and, more particularly, to a portable, self-contained stump remover that cuts and grinds a tree stump. This apparatus is sufficiently light in weight so that it may be hand held by the operator.

BACKGROUND ART

Prior portable tree stump removers, of the type that cut, grind and mill away a stump, are of complicated construction and are usually relatively large, cumbersome, heavy and expensive. Wheels are customarily employed to transport the stump remover to a tree stump and to support the stump remover during the cutting process. Many of these removers must be towed to and from the job site and many have no independent built-in driving power source and must be driven or powered by auxiliary equipment, such as by the power take off shaft of a tractor.

DISCLOSURE OF INVENTION

In contrast, the stump remover of the present invention exhibits none of these disadvantages and instead provides a unique stump remover of relatively simple and inexpensive construction, and which is small, light weight and entirely self-contained, thereby requiring no external power source whatsoever. Moreover, the stump remover can be handled by a single person (the operator) and, in fact, may be hand held by that person during cutting of a tree stump. Because of its physical size and weight, the stump remover of the invention may be transported to and from the job site in the trunk of an ordinary passenger automobile with the trunk lid closed, and this is possible even if the automobile is a sub-compact.

The invention provides a portable, self-contained stump remover which is manually movable by an operator across a tree stump to effect grinding thereof. The stump remover comprises a base element having a lower base surface for engaging and resting on the top of the tree stump when the stump remover is placed on the stump. The base element may take any of a variety of different forms, such as a plate, strip, bar, rod or merely an edge portion, in order to provide a suitable lower base surface for contacting and resting on the stump. There is at least one rotating cutting device having a plurality of cutting teeth. Driving means (such as a small gasoline engine whose output shaft is mechanically coupled, either directly or indirectly, to the cutting device) rotates the cutting teeth through a circular path at least a portion of which path extends below the lower base surface provided by the element. A cutting depth is defined by the extent to which the rotating cutting teeth project below the base surface. When the operator places the stump remover on the tree stump so that the lower base surface engages the stump, the base surface effectively supports, guides and stabilizes the stump remover as it is manually moved by the operator across the stump, the stump thereby being cut away and ground down to the cutting depth as the stump remover traverses the stump. If the base element is located on one side of the rotating cutting teeth, the stump remover could be manually moved across the stump by the operator in the direction which permits the lower base surface to precede the rotating cutting teeth and ride on the top of the stump.

The amount by which the cutting teeth project below the lower base surface may be made adjustable to vary the cutting depth, depending upon the type of tree stump (hard or soft wood and the stump size) being removed. Appropriate handles may also be provided for hand holding and guiding the stump remover across the tree stump. Moreover, for safety reasons the cutting device may be shrouded to protect the operator not only from contact with the rotating cutting teeth but also from the flying wood debris, such as wood chips and sawdust, produced during the stump cutting process.

Another aspect of the invention includes a portable stump remover that is adapted to be moved across a tree stump to effect comminution of the stump, and employs a unique method and apparatus for accomplishing this task. In particular, in a preferred embodiment, the stump remover includes a frame, a prime mover mounted to the frame, and at least one rotatable cutting device with plural chisel elements carried on the frame and operably associated with the prime mover so that the cutting device and chisel elements thereof are rotated in a circular path by the prime mover.

According to one aspect of the invention, a preferred form of the cutting device includes a plurality of peripherally spaced chisel elements with at least one of the chisel elements being laterally offset relative to another of the chisel elements.

Regardless of the form of the arrangement of the chisel elements, another aspect of the invention relates to a unique pivot means which is carried on the frame and which is adapted to engage the tree stump at a fixed location so that the stump remover is pivotable about the pivot means in a plane substantially parallel to the plane defined by the surface of the tree stump.

The unique, offset, chisel element arrangement provides a greater material removal capability and increases the efficiency of operation. The unique pivot means also accommodates efficient operation, and permits the stump remover to be efficiently operated by moving it in an arc on the stump. The pivot means aids in maintaining control during the stump comminution process.

Numerous other advantages and features of the present invention will become readily apparent from the following detailed description of the invention, from the claims, and from the accompanying drawings.

BRIEF DESCRIPTION OF DRAWINGS

The features of the invention which are believed to be novel are set forth with particularity in the appended claims. The invention may best be understood, however, by reference to the following description in conjunction with the accompanying drawings in which like reference numbers identify like elements, and in which:

FIGS. 7 and 7a illustrate the manner in which the stump remover of FIGS. 1-6 may be modified in accordance with another embodiment of the invention to provide means for permitting adjustment of the cutting depth, and also to provide a shroud around the cutting device, the cutting device normally being retracted upwards by a spring bias into the shroud (shown in FIG. 7) so that the cutting teeth do not project below the lower base surface, but are capable of being lowered by the operator, against the force of the spring bias, in order to extend the teeth below the base surface (shown in FIG. 7a) to effect grinding of a tree stump;

FIGS. 8 and 8a show another modification of the stump remover of FIGS. 1-6 in which the cutting depth is variable and wherein the position of a shroud is adjustable to vary the extent to which the rotating cutting teeth are enclosed by the shroud, FIG. 8 illustrating the shroud completely covering and surrounding the cutting teeth and the teeth being above the lower base surface to provide a zero cutting depth, while FIG. 8a shows a maximum cutting depth with the shroud being positioned to maximize the exposure of the cutting teeth out of the shroud;

FIGS. 14 and 15 are bottom and side views respectively of another embodiment wherein a pair of oppositely rotating cutting devices each has a plurality of cutting teeth that rotate through a circular path whose plane is 90 degrees displaced from the plane defined by the circular path followed by the cutting teeth in the previous embodiments, the entire circular paths of the teeth in the FIGS. 14 and 15 embodiment therefore lying below the lower base surface to effect cutting of a stump;

FIG. 18 is a simplified, perspective view of another embodiment illustrating a further aspect of the invention;

FIG. 19 is a side elevational view of the embodiment illustrated in FIG. 18;

FIG. 20 is a front end view of the embodiment illustrated in FIG. 18;

FIG. 21 is a fragmentary, side elevational view similar to FIG. 19, but showing a modification of the embodiment illustrated in FIGS. 18-20;

FIG. 22 is a greatly enlarged, fragmentary, cross-sectional view taken generally along the plane 22—22 in FIG. 21;

FIG. 23 is a top plan view similar to FIG. 2, but showing a further modification of the embodiment illustrated in FIGS. 1-6; and FIG. 24 is a fragmentary, front end view of the modification illustrated in FIG. 23.

BEST MODE FOR CARRYING OUT THE INVENTION

Figure 1:
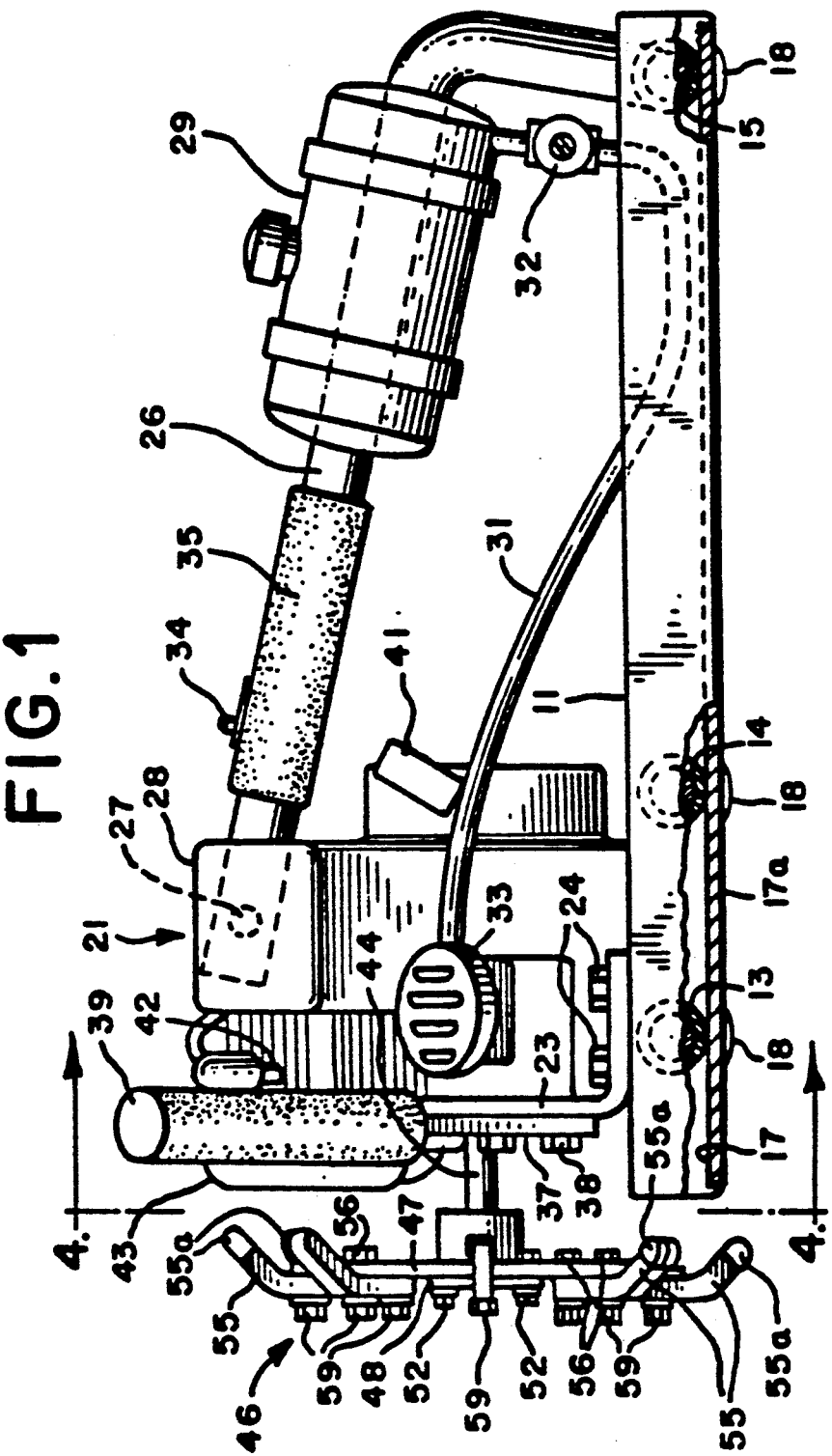
FIG. 1 is a side view of a tree stump remover constructed in accordance with one embodiment of the invention.
Figure 2:
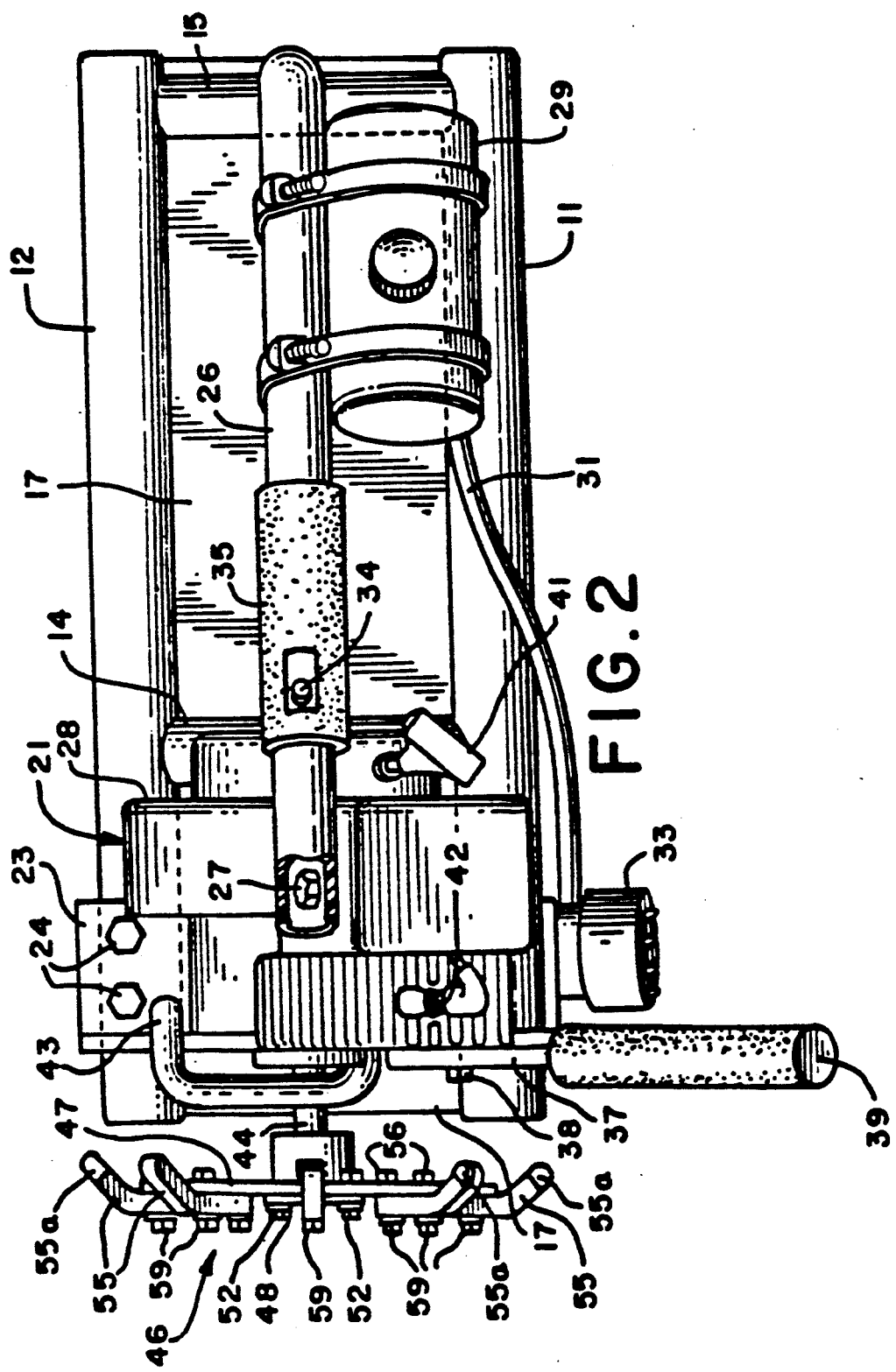
FIGS. 2 and 3 are top and end views respectively of the, stump remover of FIG. 1.
Figure 3:
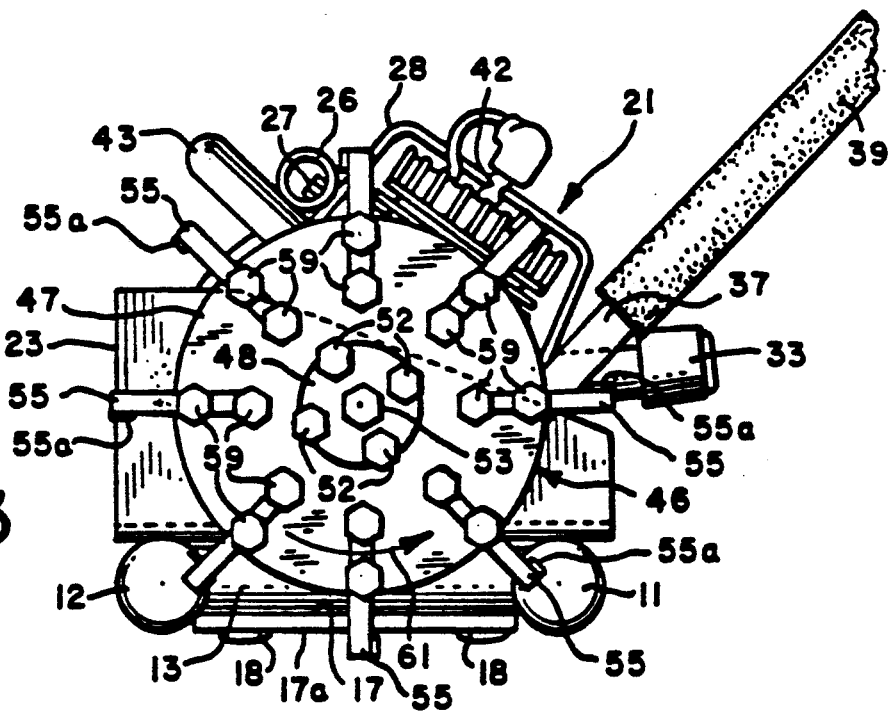
Figure 4:
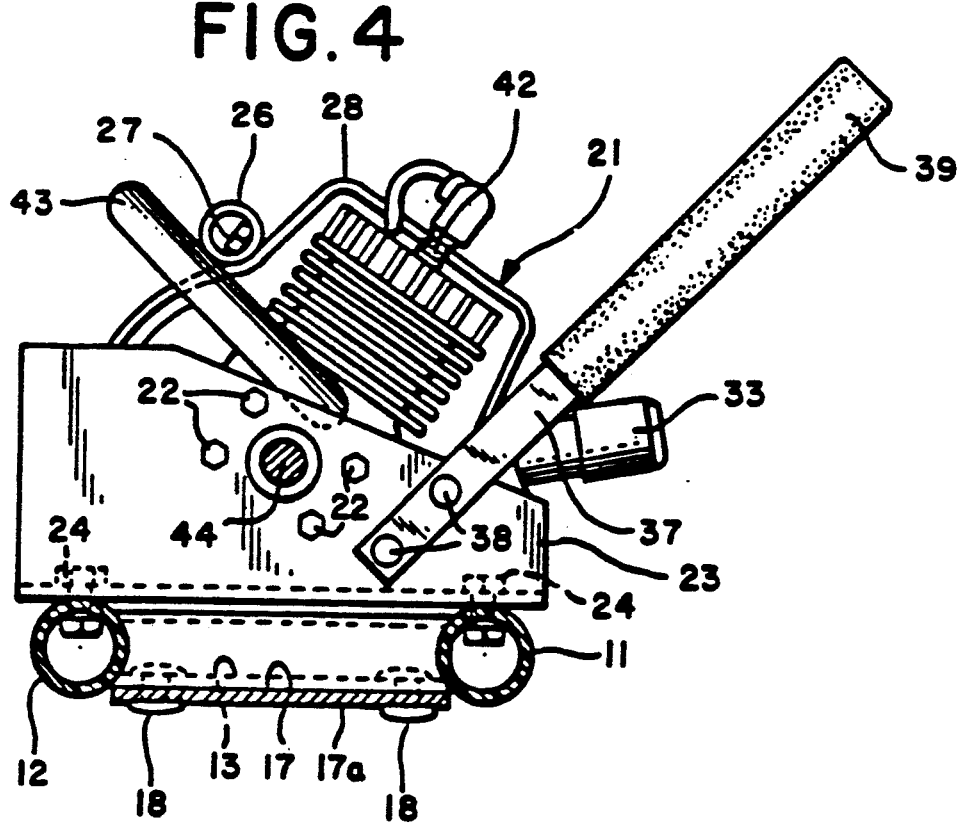
FIG. 4 is a sectional view of the stump remover taken along line 4—4 in FIG. 1.

Turning now to the embodiment of FIGS. 1-6, a rectangular-shaped plastic support frame is provided by the two long parallel plastic tubes 11 and 12 and the three shorter plastic tubes 13, 14 and 15 that attach to and interconnect the tubes 11 and 12. Secured to the bottom of the plastic frame is a rectangular-shaped plastic base plate or element 17 which is preferably affixed to the three tubes 13, 14 and 15 by means of a series of six carriage bolts 18 and appropriate nuts, the nuts being inside of the tubes, as best seen in FIG. 4. Only four of the six carriage bolts 18 are visible in FIGS. 1-6. The bottom surface 17a of base plate 17 provides a lower base surface.

A small gasoline internal-combustion engine or motor 21 is secured by bolts 22 (see FIG. 4) and appropriate nuts (not shown) to an L-shaped metal bracket 23 which in turn is affixed by bolts 24 and appropriate nuts (see FIG. 4) to tubes 11 and 12. An L-shaped plastic tube 26 has one end bolted (by bolt 27) to the housing 28 of gasoline engine 21 and the other end rigidly secured to tube 15. A gasoline tank 29, strapped to and held by tube 26, is coupled by fuel line 31 through an on/off fuel line valve 32 to the carburetor 33 of engine 21.

A dead man's switch 34 is mounted on tube 26 for manually controlling the operation of engine 21. Tube 26 also serves as a handle to be held by the operator's right hand. The portion of tube 26 to be grasped by the operator's right hand is covered by a cushion sleeve 35 for ease of handling. A handle for the operator's left hand is provided by metal bar 37, one end of which is affixed by the two bolts 38 to bracket 23 while its other end is secured to the inside of a plastic tube over which is provided a cushion sleeve 39. The engine or motor 21 includes a pull start 41, a single spark plug 42 and an exhaust pipe 43 and operates in conventional fashion in order to rotate its output shaft 44 anytime switch 34 is held closed by the operator.

Figure 5:
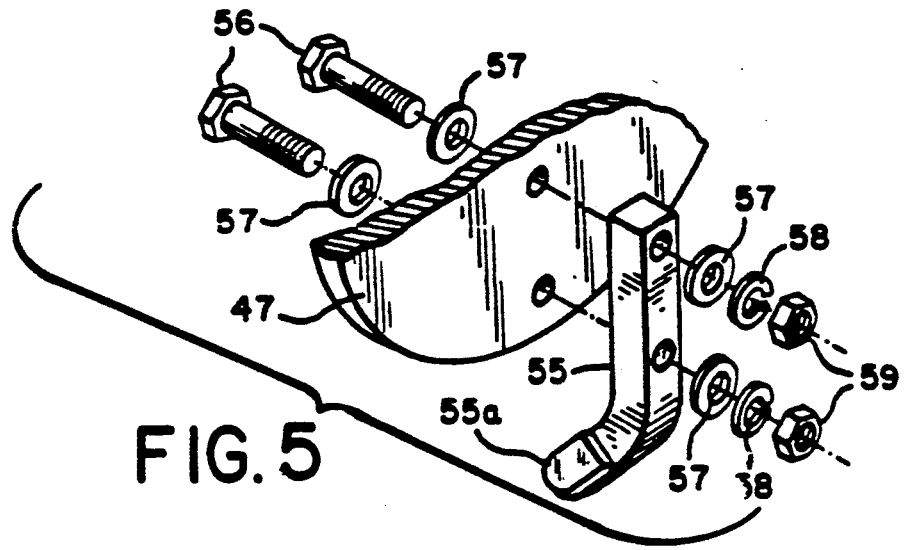
FIG. 5 is a fragmentary, exploded, perspective view of a portion of the stump remover of FIG. 1 and shows the manner in which a cutting tooth may be removably affixed to a cutting device to facilitate replacement of the tooth.

A rotatable cutting device 46 is mounted on and secured to output shaft 44 so as to be driven directly by engine 21. More specifically, device 46 includes a circular disc or wheel 47 which is affixed to hub 48 by means of bolts 49 (see FIG. 6) and nuts 52, the hub being secured to shaft 44 by bolt 53. Cutting device 46 has a series of eight cutting teeth 55 evenly spaced around its circular periphery and projecting beyond or outside of the circumference of disc 47. Preferably, these teeth are removably secured to the cutting device to facilitate easy replacement when the teeth are worn out. This is best illustrated in FIG. 5 where it is seen that each tooth 55 is attached to the periphery of wheel 47 by means of two bolts 56, four washers 57, two lock washers 58 and two nuts 59. When driven by engine 21, cutting device 46 rotates in a counter-clockwise direction as viewed in FIG. 3 and as indicated by the arrow 61 in the figure. The leading surface of the radially outermost ends or tips of the rotating teeth 55 are provided with a carbide coating 55a since, as will be seen, those are the surfaces that will engage and cut a tree stump.

Figure 6:
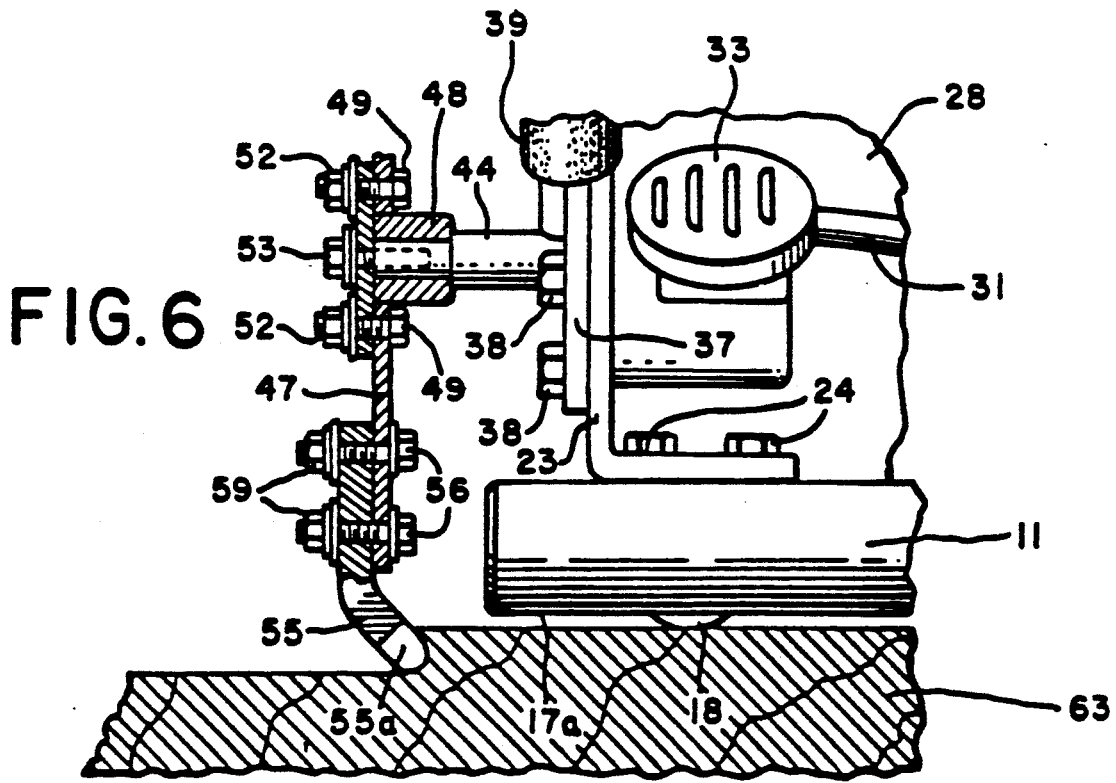
FIG. 6 is a fragmentary, side view, partly in section, of a portion of the stump remover of FIG. 1 and illustrates the manner in which the rotating cutting teeth cut into and remove a tree stump.

As is apparent, the circular path, through which the cutting teeth 55 rotate, defines a plane which is perpendicular to the planar, lower base surface 17a provided by the base plate 17, A portion of this path extends below the lower base surface 17a, the cutting depth of the stump remover being determined by the extent to which the rotating cutting teeth 55 project below the base surface 17a. In operation, after pull start 41 and switch 34 are actuated to start engine 21 and effect rotation of cutting device 46, the operator grasps cushion sleeve 35 with his right hand and cushion sleeve 39 with his left hand and lifts the stump remover and places the lower base surface 17a on top of a tree stump to be removed so that the cutting device is positioned next to, but does not contact, the tree stump. The operator then manually moves, specifically pulls or drags, the stump remover across the stump. Preferably in a generally linear direction along the longitudinal axis of base plate 17 (namely to the right as viewed in FIGS. 1, 2 and 6), so that the base surface 17a precedes the rotating cutting teeth 55 and rides on top of the stump, the cutting teeth thereby cutting the stump away and grinding or milling it down to the cutting depth. This is clearly evident in FIG. 6 which illustrates a tree stump 63 being cut by the cutting teeth. Of course, the operator must traverse the stump repeatedly to completely remove the stump down to or below the ground level. Depending on the size of the tree stump and the type of tree, several passes across the stump will probably be necessary since each pass removes only a portion of the stump down to the cutting depth as shown in FIG. 6. The stump remover is capable of cutting and grinding a stump to a level substantially below the ground or grade level and well into the stump's roots.

It is to be appreciated that when base plate 17 is placed on and engages a tree stump, the base surface 17a functions to support, guide and stabilize the stump remover as it is manually moved by the operator across the stump. With the base plate providing a planar or flat lower base surface of substantial size to interface with the top surface of the stump, the stability of the stump remover is significantly enhanced. It is to be noted, however, that by sacrificing some stability the function performed by base plate 17 and base surface 17a may be performed by any of a wide variety of different structures having different sizes and shapes. For example, base plate 17 may comprise merely a narrow bar or strip or even a rod. All that is necessary is to provide some reference or base surface that will ride on top of the stump, and below which base surface the rotating cutting teeth project, as the stump remover is moved across the stump. The position of the base surface relative to the lowermost portion of the circular cutting path of the rotating cutting teeth, namely the distance or separation between that base surface and the lowermost portion of the cutting path, defines the cutting depth of the stump remover.

While the output shaft 44 of the driving means, namely gasoline engine 21, is directly connected to the cutting device 46, it will be understood that the coupling between the driving means and the cutting device may be indirect and may comprise any appropriate drive, such as belt, gear, fluid, etc. If desired, the coupling may be adjustable or the driving means may be adjustable to vary the speed of the cutting device. In addition, it may be desirable to include a slipping means of some type or an automatically releasable clutch in the coupling so that the driving connection from the driving means will be effectively interrupted if the cutting device becomes hung up or stuck, thereby minimizing the possibility of burning out the driving means.

In the embodiment shown in FIGS. 1-6, the positions of the driving means (engine 21), the circular cutting path through which the cutting teeth 55 rotate, and the base element 17 and its lower base surface 17a are all effectively fixed relative to each other, the cutting depth of the stump remover thereby also being fixed. In the embodiment of FIGS. 7 and 7a, which is a modification of the FIGS. 1-6 embodiment, the position of the driving means and the circular cutting path are fixed relative to each other, but their positions are variable relative to that of the lower base surface to facilitate adjustment of the cutting depth. An adjustable cutting depth is desirable for cutting different types of tree stumps. In effect, the driving means is adjustably attached to the base element to permit adjustment of the cutting depth. This is achieved in the embodiment of FIGS. 7 and 7a by means of a bracket arrangement 66 that may be adjusted to vary the distance between the driving means 21, and thus the cutting teeth 55, and the lower base surface 17a of base element or plate 17.

To elucidate, a bracket plate 67, affixed to plastic tubes 11-15 and base plate 17, has a vertical slot 67a for accommodating a bolt 68 which is screwed into the housing 28 of engine 21. Plate 67 also has a pair of angular slots 67b through which a pair of studs 69 extend, the studs being rigidly secured to housing 28. A pair of coil springs 71 are mounted between engine 21 and the base structure formed by tubes 11-15 and base element 17. A shroud 73, affixed to tubes 11 and 12, surrounds cutting device 46 to provide a guard over the cutting device and a protective shield against flying wood debris, created during the stump cutting process, that may otherwise injure the operator of the stump remover. Shroud 73 has a downwardly extending open end through which the cutting teeth 55 may project in order to engage and grind a tree stump. When bolt 68 is loose and not tightly screwed into engine housing 28, engine 21 is positioned as shown in FIG. 7 and is spring mounted on tubes 11-15 and base element 17, the coil springs 71, which serve as a biasing means, normally biasing or urging engine 21 and cutting device 46 upwards in a direction away from base element 17. In that FIG. 7 position of engine 21, cutting device 46 is retracted upwards into shroud 73 to the extent that the lowermost projections of the cutting teeth 55 are positioned above the lower base surface 17a thereby providing a zero cutting depth.

If it is desired to adjust the cutting depth to a particular selected level and to maintain the depth fixed at that level, engine 21 may be pushed down by the operator against the biasing force of springs 71 until the cutting teeth extend below base surface 17a the desired amount. When that selected cutting depth is reached, bolt 68 is tightened securely so that bracket plate 67 will be fixed to housing 28 and the selected cutting depth will be locked in. FIG. 7a shows the stump remover when it is locked in at the maximum cutting depth. A bar 74, which is secured to engine housing 28 by bolt 75, provides a lever which may be depressed by the operator to facilitate pushing down of engine 21. As the engine is pushed down from its uppermost position shown in FIG. 7 to its lowermost position shown in FIG. 7a, bracket plate 67 and everything affixed thereto (namely, tubes 11-15, base element 17, base surface 17a and shroud 73) will remain stationary while engine 21 and cutting device 46 move both vertically and slightly sideways to the right due to the guiding effect of angular slots 67b and studs 69, the studs being cammed and shifted to the right as they are pushed down to the bottom of slots 67b. The desirability of the lateral shifting of engine 21 and cutting device 46 will be appreciated later. Of course, since bolt 68 is also moving sideways to the right, as will as vertically down the slot 67a, as engine 21 is lowered, the diameter of the shaft of bolt 68 should be sufficiently smaller than the width of vertical slot 67a so that the slot will not interfere with the lateral movement of engine 21 and cutting device 46.

If it is not necessary to lock the stump remover at a particular desired cutting depth, bolt 68 may be loosened so that the spring action provided by coil springs 71 will automatically raise engine 21 and retract the cutting device 46 further into shroud 73, as shown in FIG. 7. In this way, until actual cutting of a stump is desired, no pressure is exerted by the operator on lever 74, thereby causing springs 71 to hold the stump remover in its FIG. 7 position so that the cutting teeth 55 will not project below base surface 17a. In this position, the protection afforded by shroud 73 is maximized. When stump cutting is desired, the operator merely depresses lever 74 to overcome the biasing force of springs 71 and lower the cutting teeth 55 to the extent desired. Of course, if the pressure on lever 74 is sufficient to push engine 21 down to its position shown in FIG. 7a, the maximum cutting depth is achieved. When it is desired to cease cutting, the operator releases the downward pressure on lever 74, and consequently on engine 21, whereupon springs 71 cause the cutting device 46 to retract further into shroud 73 as shown in FIG. 7. The advantage of angular slots 67b and studs 69 will now be appreciated. As engine 21 and cutting device 46 are raised, relative to base surface 17a, in going from their positions illustrated in FIG. 7a to their positions illustrated in FIG. 7, the cutting device moves laterally to the left. In other words, under the guidance of angular slots 67b and studs 69, cutting device 46 moves in an angular direction both upwards and sideways to the left. This maximizes the separation of the cutting device from base surface 17a, which will be helpful in freeing the cutting device if it ever gets hung up or stuck in a stump being cut.

Figure 8:
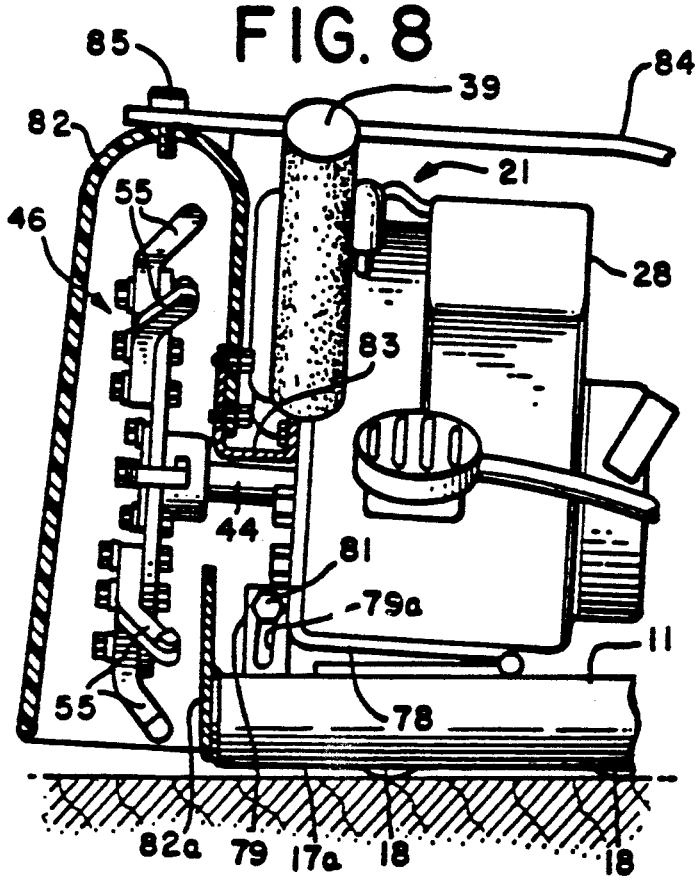
Figure 8A:
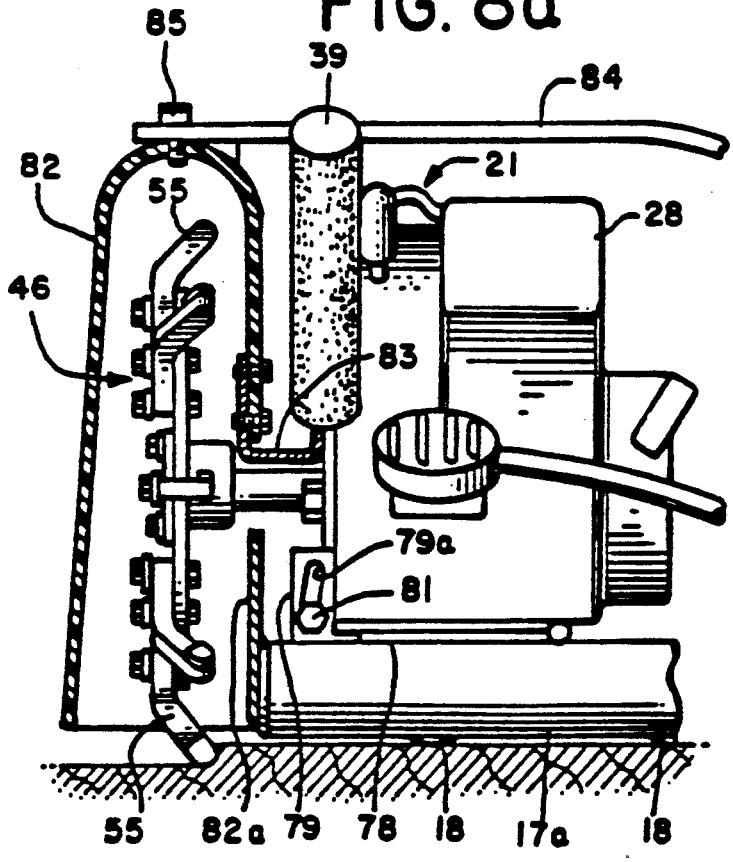

The embodiment of FIGS. 8 and 8a illustrates another arrangement for providing an adjustable engine mount to obtain a variable cutting depth that may be locked in at a desired setting. Engine 21 is pivotally connected, by means of hinge 78, to the base structure comprising tubes 11-15, base element 17 and base surface 17a. The position of engine 21, and consequently that of cutting device 46, relative to the position of base surface 17a may therefore be adjusted to establish the cutting depth at any desired setting over a predetermined range, and that setting may be locked in by means of bracket plate 79 which is affixed to tube 11 and has a slot 79a through which bolt 81 extends and screws into engine housing 28. In FIG. 8, hinge 78 is locked in its position providing a minimum, actually zero, cutting depth, while in FIG. 8a the hinge is adjusted to and locked in its maximum cutting depth position.

This embodiment also includes a shroud 82 covering and surrounding the cutting device 46 and whose position, relative to that of the cutting device, is adjustable by the operator to vary the extent to which the cutting teeth 55 project down through the shroud's open end. Portion 82a of the shroud is affixed to tubes 11 and 12, whereas the remaining and major portion of shroud 82 is attached to the engine housing 28 by means of a flexible spring bracket 83 that may be flexed by the operator to raise the shroud and increase the amount by which the cutting teeth 55 extend down through the shroud's open end. In effect, spring bracket 83 serves as a biasing means for normally biasing or urging shroud 82 in its position providing maximum coverage and enclosure of cutting device 46. Lever or bar 84, attached to shroud 82 by bolt 85, may be depressed by the operator to bend the flexible spring bracket 83 to raise the shroud, release of the pressure by the operator causing the shroud to lower, thereby increasing the enclosure around the cutting teeth 55.

Figure 9:
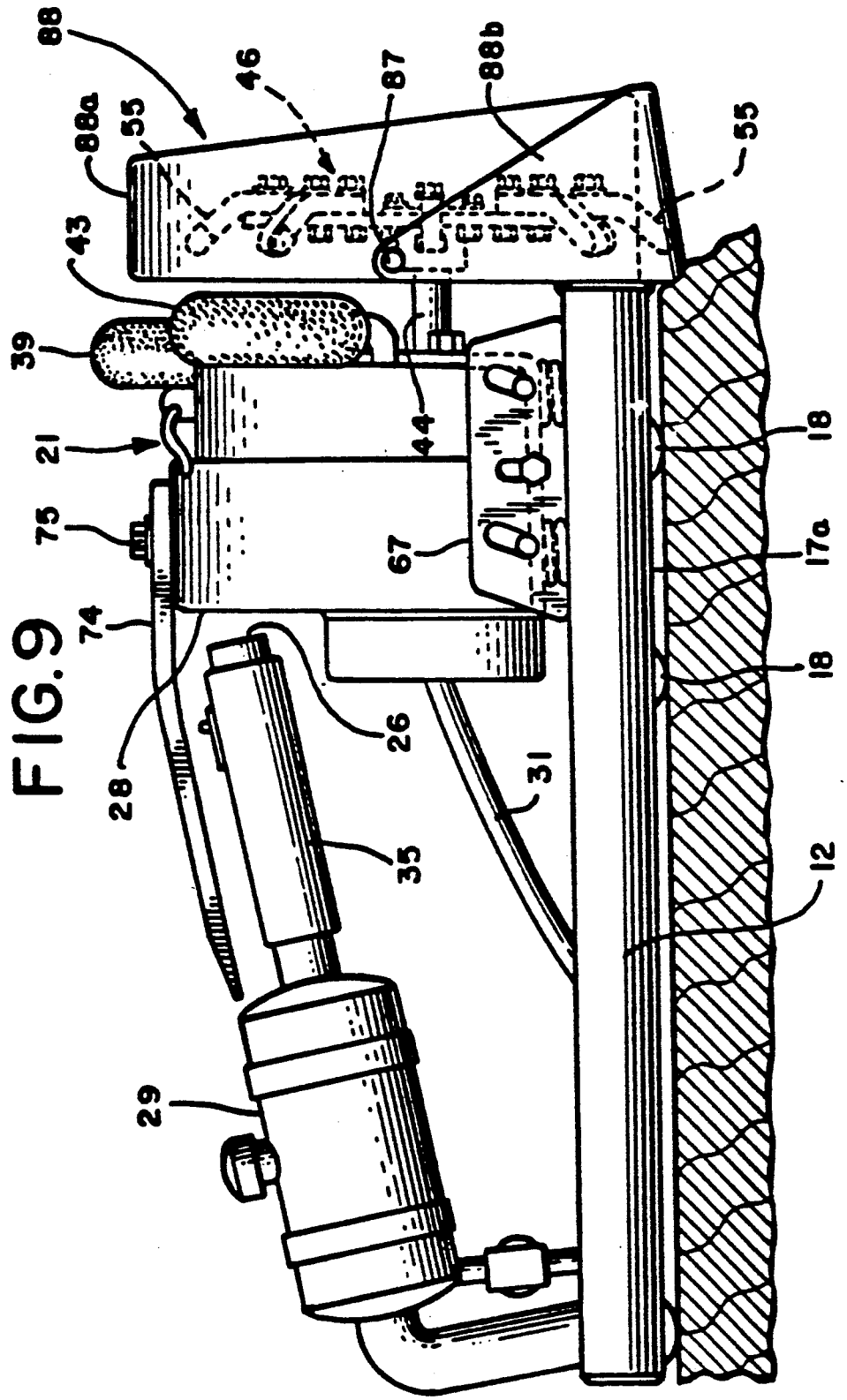
FIG. 9 is a side view of a tree stump remover constructed in accordance with another embodiment of the invention and illustrates that the shroud around the cutting teeth may have a pivotally connected guard that normally covers the cutting teeth which extend below the lower base surface and is pivoted and cammed by the tree stump out from under the cutting teeth as the operator moves the stump remover across the stump.

The embodiment of FIG. 9 is similar to that of FIGS. 7 and 7a and includes a shroud 88, a major portion 88a of which is affixed to tubes 11 and 12 and encloses substantially all of the cutting device 46, portion 88a having a downwardly extending open end through which the cutting teeth 55 may project downward to engage and grind a tree stump. Shroud 88 has another, smaller portion 88b which is pivotally connected, by a pair of pivot pins 87 (only one of which is shown in FIG. 9), to and normally encloses and guards the open end of shroud portion 88a to completely envelop cutting device 46. Portion 88b is shown in its normal position in FIG. 9 and in that position extends below both the cutting teeth 55 and lower base surface 17a. When the operator pulls the stump remover across a stump, portion 88b of the shroud engages the stump and is pivoted and cammed by the stump out from under the cutting teeth 55, thereby permitting the cutting teeth to cut the stump.

Figure 10:
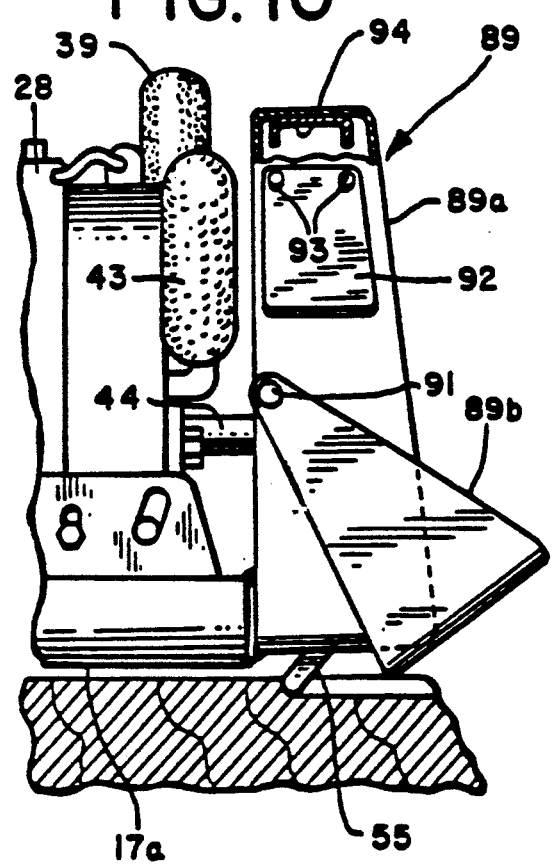
FIG. 10 is a fragmentary side view and FIG. 11 is an end view showing a modification of the stump remover of FIG. 9 wherein the shroud is provided with an internal channel-shaped debris guide to lead the flying wood debris to a flap-covered opening through which the debris may exit the shroud.
Figure 11:
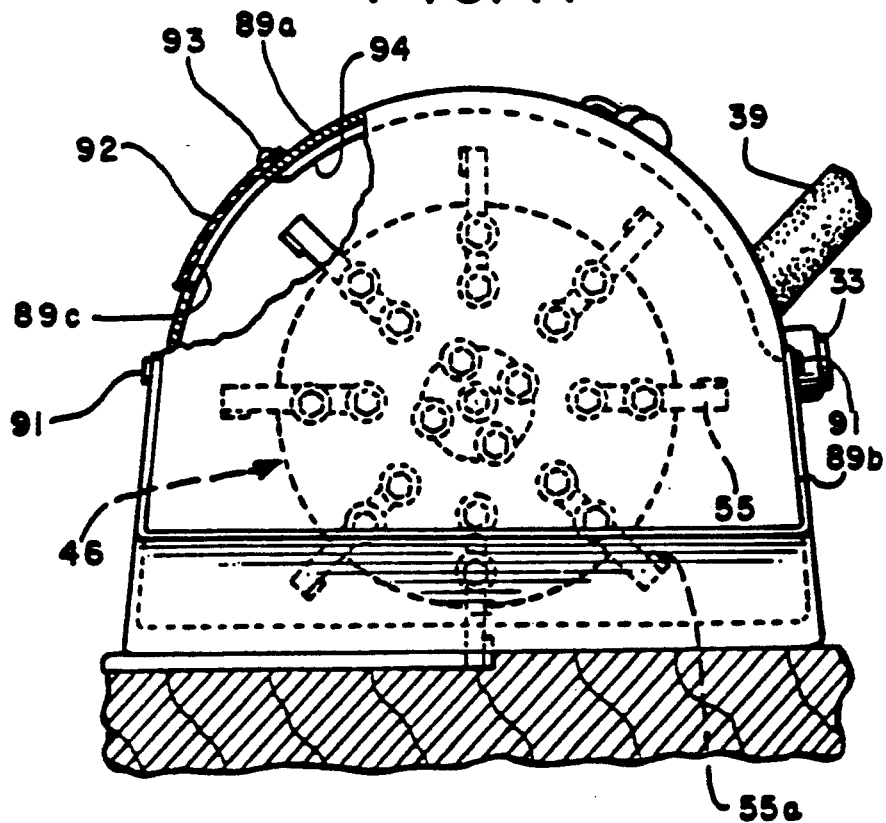

The FIG. 9 embodiment may be modified to provide the embodiment of FIGS. 10 and 11 wherein a similar shroud 89 has a major fixed portion 89a and a minor movable portion 89b which is pivotally connected to portion 89a, by a pair of pivot pins 91, so that it may be cammed or kicked out of the way by a tree stump to allow the cutting teeth to cut the stump. Shroud 89 differs from shroud 88 in having an opening 89c (seen in FIG. 11) in portion 89a, through which opening the flying wood debris may exit from the shroud. A flexible debris flap 92 is connected along one of its edges to the outside of the shroud by screws 93 and normally covers the opening 89c, the flap 92 being pushed or flexed out during the cutting process by force of the flying wood debris to uncover the opening and allow the debris to escape from the shroud. The inside of shroud portion 89a also has a channel-shaped debris guide 94 having a pair of depending, parallel guide tracks for leading or guiding the flying wood debris to opening 89c.

Figure 12:
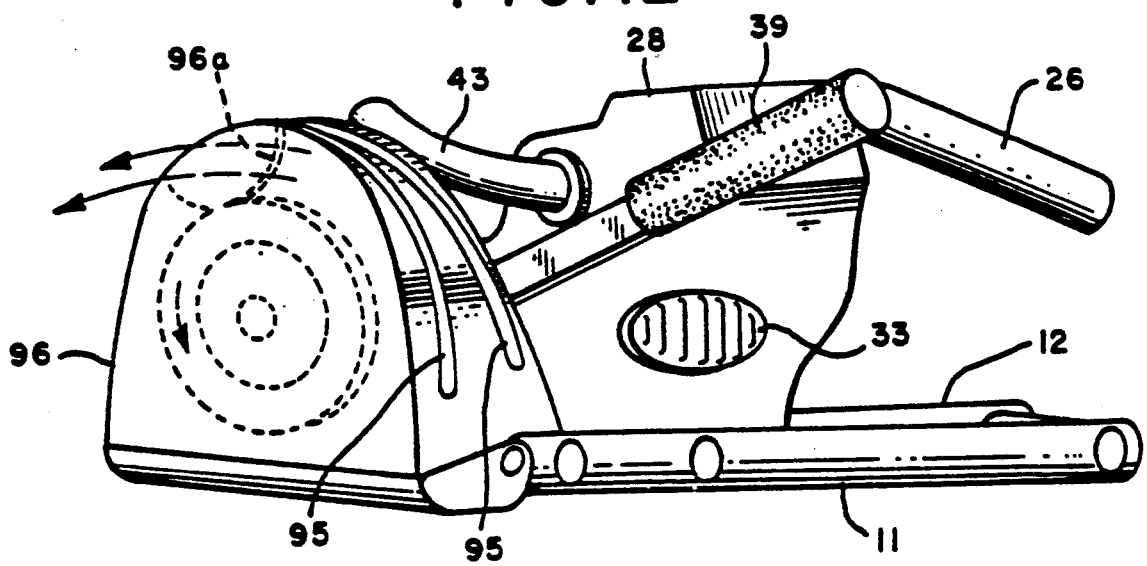
FIG. 12 illustrates a stump remover similar to that shown in FIGS. 9, 10 and 11 and shows that the debris guide, within the shroud, may take the form of two non-parallel, converging guide tracks that effectively funnel the flying wood debris to the opening in the shroud.

In the embodiment of FIG. 12, the debris guide has two non-parallel guide tracks 95, on the inside of shroud 96, that converge toward and lead to an opening 96a in the shroud in order to effectively funnel the flying wood debris to the opening.

Figure 13:
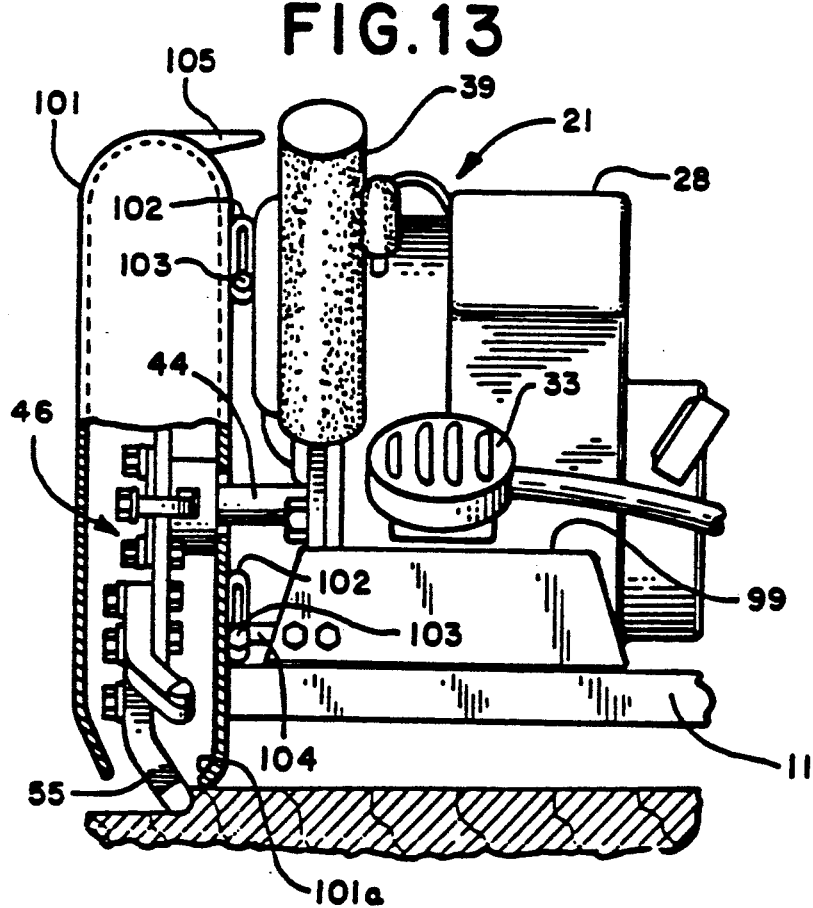
FIG. 13 is a fragmentary side view showing a modification of the stump remover of FIG. 1 and includes a vertically adjustable shroud a lower edge portion of which shroud serves as the base element, and provides the lower base surface, so that adjusting the shroud varies not only the extent to which the cutting teeth are enclosed by the shroud but also the cutting depth.

As mentioned previously, the base element that provides a lower base surface for riding or resting on top of a tree stump may take a variety of different forms. In the FIG. 13 embodiment, a portion of a vertically adjustable shroud may serve as the base element. In that figure, a metal bracket 99 is secured to both engine 21 and plastic tube 11 to provide a stationary engine mount. Shroud 101 is fastened to engine 21 by an adjustable bracket arrangement which permits the shroud to be vertically adjusted to, and locked in, a selected vertical position relative to engine 21 and consequently to cutting device 46. Specifically, a pair of brackets 102 are affixed to shroud 101, while a pair of bolts 103, each of which extends through a slot of one of brackets 102, screw into either the housing 28 of engine 21 or into bracket 104 which is bolted to bracket 99. Note that shroud 101 is not secured to plastic tube 11, but is adjustable with respect thereto. Moreover, a plastic plate equivalent to plate 17 is not needed between tubes 11 and 12. Note also that as shroud 101 is vertically adjusted relative to cutting device 46, an edge or rim portion 101a of the downwardly extending open end of the shroud (through which open end the cutting teeth 55 may engage and cut a tree stump) also moves vertically and provides a lower base surface that rides on top of and engages the stump when the stump remover is placed on the stump, as is evident in FIG. 13. Edge portion 101a therefore functions as and constitutes the base element, providing a lower base surface that engages the tree stump and supports, guides and stabilizes the stump remover as it is moved across the stump by the operator. Hence, when the vertical position of shroud 101 is changed, relative to the position of cutting device 46, the extent to which the cutting teeth 55 are covered and enclosed by the shroud is changed, as well as the cutting depth, namely the extent to which the cutting teeth project below the lower surface of edge portion 101a. As shown in FIG. 13, shroud 101 is locked in its uppermost position, thereby minimizing the enclosure of cutting teeth 55 by the shroud and maximizing the cutting depth. Tab 105 is affixed to shroud 101 and may be grasped by the operator to facilitate vertical adjustment of the shroud and setting of the cutting depth at the desired level.

Figure 16:
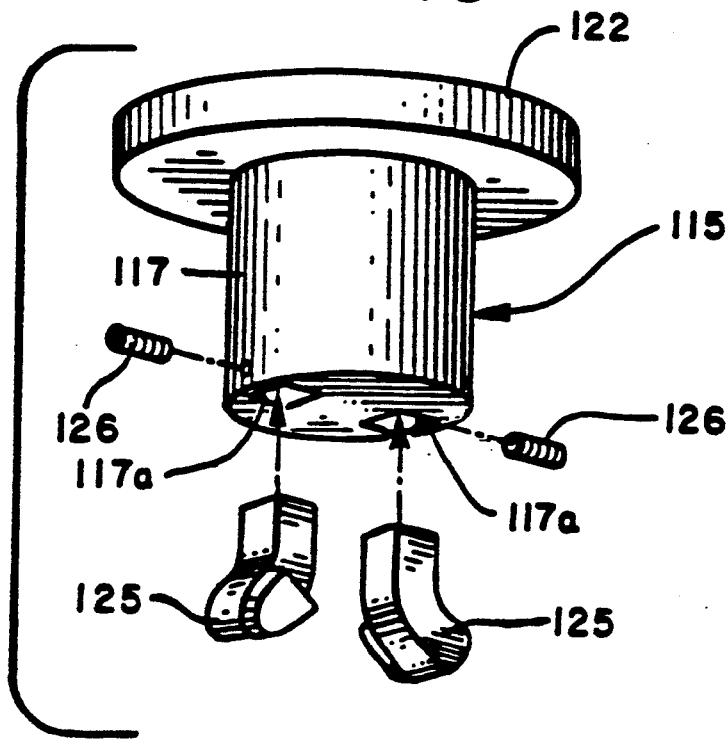
FIG. 16 is a fragmentary, exploded, perspective view of a portion of the stump remover of FIGS. 14 and 15 and illustrates the manner in which the cutting teeth of each cutting device may be removably secured to the device.

In the embodiments of FIGS. 1-13, the plane, defined by the circular path through which the cutting teeth rotate, is generally vertical and is perpendicular to the generally horizontal direction in which the operator usually moves the stump remover across a tree stump during the cutting process. With the plane of the circular path being vertical, the stump is cut by the rotating cutting teeth only as they rotate through the lowermost portion of the circular path, namely the portion of the path that extends or lies below the lower base surface. In the embodiment of FIGS. 14-16, there are also cutting teeth that rotate in a circular path, but the plane of this path is generally horizontal and parallel to the direction in which the operator pulls the stump remover across a tree stump to effect cutting thereof. In this case, the entire circular path of the cutting teeth lie below the lower base surface when the stump is cut. More particularly, in the embodiment of FIGS. 14-16 a support frame is provided by a pair of parallel plastic tubes 107 and 108 that are interconnected by a plastic tube 109. The base element takes the form of a plastic bar 112 which is bolted to tube 109, the bottom surface 112a of the base element thereby providing the lower base surface. Although the complete driving means is not shown, it is to be understood that it may comprise an internal combustion gasoline engine which is oriented 90 degrees from its orientation in the previous embodiments so that the engine's output shaft 113 will be vertical and will extend downwardly. A drive gear 114 is secured to shaft 113 and will rotate with the shaft in the direction indicated by the associated arrow in FIG. 14 when the engine is operating. Instead of having only one cutting device rotated by engine shaft 113, two (115 and 116) are simultaneously rotated with each cutting device having a plurality of cutting teeth. Cutting device 115 comprises a vertical, cylindrical shaped body 117 rotatably mounted within a bearing 118 which is bolted to tube 107, whereas cutting device 116 has a similar vertical, cylindrical shaped body 119 rotatably mounted within a bearing 121 secured to tube 108. A driven gear 122, secured to the upper end of body 117, engages and is driven by drive gear 114 to effect rotation of body 117 around the body's longitudinal axis and in the direction indicated by the associated arrow in FIG. 14. Body 119 also has a driven gear 123 affixed to its upper end, but this gear meshes with and is driven by gear 122 so that body 119 will rotate in the direction opposite to that of body 117.

Each body 117, 119 has a pair of cutting teeth 125 removably attached to the body's lowermost end to facilitate replacement of the teeth when they are worn out. This is best seen in FIG. 16 which illustrates, by way of example, the manner in which the cutting teeth 125 are affixed to body 117 of cutting device 115. Body 117 has a pair of pockets or openings 117a for receiving the upper ends of the cutting teeth. Set screws 126 are provided to retain the cutting teeth 125 in their respective pockets.

It is apparent that when the engine is operating, shaft 113 causes the cutting teeth 125 of each cutting device 115, 116 to rotate through different circular paths, both of which paths lie in the same horizontal plane and entirely below the lower base surface 112a. Hence, if the operator places the stump remover of FIGS. 14-16 on top of a tree stump, base surface 112a will rest on and engage the stump. By moving the stump remover across the stump in the direction in which base surface 112a will lead or be ahead of the rotating cutting teeth 125, the stump will be cut away and ground down to the cutting depth determined by the distance that cutting teeth 125 project below base surface 112a. Of course, rotating the cutting devices 115, 116 in opposite directions balances or neutralizes the opposing torques produced by the cutting devices.

Figure 17:
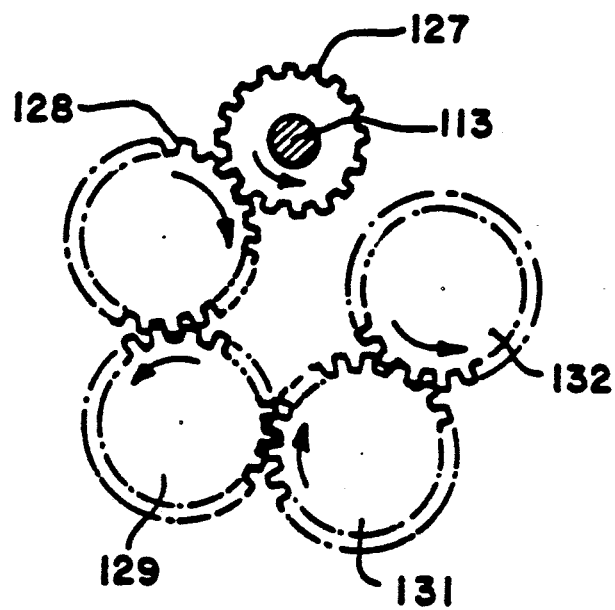
FIG. 17 shows a variation of the embodiment of FIGS. 14, 15 and 16 wherein four cutting devices are employed, two of which rotate in one direction while the other two rotate in the opposite direction to balance the opposing torques.

The invention may also be implemented by employing more than two simultaneously rotating cutting devices. In the FIG. 17 embodiment, the vertical and downwardly extending output shaft 113 of the engine rotates a gear 127 which drives the gear train comprising the four gears 128,129,131 and 132, each of gears 128-132 in turn rotating associated cutting devices (not shown) similar to that shown in FIGS. 14-16. As indicated by the arrows in FIG. 17, the two cutting devices rotated by gears 128 and 131 rotate in one direction, while the other two cutting devices rotated by gears 129 and 132 rotate in the opposite direction to balance the opposing torques of the cutting devices. Preferably, when more than two cutting devices are employed, an even number should be selected in order to facilitate neutralization of the torques developed.

Another aspect of the invention is illustrated in FIGS. 18-20 wherein the stump remover is designated generally by the reference numeral 200. The stump remover 200 has a frame which includes a frame tube or base 217. Preferably, a support means or rest 219 is secured to the bottom of the frame base 217.

An optional pivot means, such as a pivot member 201 in the form of a spike or talon, is rotatably mounted to the rest 219 with a rivet or bolt 202. The pivot member 201 can be fixed or movable between a lowered, or engaging, position illustrated in FIGS. 18 and 20 by solid lines and a disengaged, or storage, position illustrated in phantom by dashed lines in FIG. 20.

In one contemplated mode of use, the stump remover 200 is positioned over a portion of the stump that is to be removed. The pivot member 201, while in the engaging position, penetrates a portion of the stump. This provides an anchor at a fixed location about which the stump remover 200 may be pivoted in a plane substantially parallel to the plane defined by the surface of the tree stump as the stump is comminuted or ground down by rotating elements described in detail hereinafter. During this process, the portion of the stump remover 200 that is forward of the pivot member 201 can be swung generally in an arc from one side of the tree stump to the other side as the tree stump is comminuted or ground away. The pivot member 201 functions to help maintain control and position of the stump remover 200 while at the same time permitting a desired range of movement.

The stump remover 200 includes a suitable prime mover, such as a relatively small, light weight, internal combustion engine 221 mounted to the frame. The engine 221 drives a suitable shaft and pulley (not visible in the Figures) around which a drive belt 223 (FIG. 21) is engaged. The drive belt 223 extends along an arm 225 which extends from the frame adjacent the engine and projects forwardly beyond the rest 219.

The end of the arm 225 carries a rotatable pulley (not visible in the Figures) engaged with the drive belt 223. The pulley is fixed to a shaft 244 which, in turn, is mounted for rotation about an axis oriented generally perpendicular to the longitudinal dimension of the arm. A chain and drive sprocket may be used in lieu of the illustrated belt drive, if desired.

The arm 225 may be provided with an exterior housing around its two elongate members (not visible in the Figures) which each define overlapping slots through which bolts can be mounted for securing the members together at a selected overall extension length. The two members are secured with the bolts at an appropriate overall length as may be necessary to provide the desired tension on the drive belt 223.

A novel cutting device 246 is mounted to the shaft 244 at the end of the arm 225. The cutting device includes a generally circular, disk-like wheel or plate 247 and a plurality of individual grinding elements such as chisel elements 255 carried on the plate 247.

The chisel elements 255 extend generally radially and are peripherally spaced about the plate 247. Each of the chisel elements 255 is a curved or angled elongate bar having a chisel tip 255a which may be provided with a carbide coating or may be a separate tungsten element. At least two, and preferably four, such chisel elements 255 are utilized. At least one of the chisel elements preferably is laterally or axially offset in one direction away from the plane of plate 247 and at least another is laterally or axially offset in the opposite direction. The offset is illustrated in FIGS. 18, 20, and 21 by the set of two chisel elements 255' offset in one direction and the set of two chisel elements 255" offset in the opposite direction.

The offset arrangement of the chisel elements 255' and 255" defines the maximum width or kerf that would be ground down or chiseled away through a tree stump in a single pass. This can also be characterized as the maximum width of the cutting device 246.

In the embodiment illustrated in FIGS. 18-20, raker elements 261 and raker elements 262 are mounted on the plate 247 with the chisel elements 455. Each raker element type, illustrated respectively by raker element 261 and 262, includes a generally straight bar terminating in a chisel tip 255a (FIGS. 18 and 19) at its distal end. The tip may be a carbide coating on a steel substrate or a tungsten element.

The raker elements 261 are disposed generally parallel to the plate 247. The raker elements 262 are disposed at an acute angle to the rotational axis of the plate 247. The raker elements 261 and 262 lie within the kerf or maximum width of the cutting device 246.

Each raker element and chisel element is preferably mounted to the plate 247 in a manner that permits radial adjustment so as to increase or decrease the material removal depth. In particular, the plate 247 is provided with a plurality of peripherally spaced, radially extending, elongate slots 271 (FIGS. 18 and 19). Each chisel element and raker element defines a pair of mounting bores 273 (FIG. 20) adapted to receive a fastener. For example, bolt 275 is disposed in each bore 273 and passes through a corresponding slot 271 in registry therewith. After a desired radial position is selected for the element, a nut 277 is threaded onto the bolt to secure the element in place.

Washers, including lockwashers, may be used adjacent the bolt head and/or adjacent the nut. Further, in order to establish the angled orientation of each raker element 262, one or more washers 279 (FIGS. 18 and 19) may be disposed around the bolt nearer to the periphery of the plate 247 between the raker element 262 and the plate 247.

The raker elements and chisel elements are illustrated as all being mounted to the same side of the plate. It will be appreciated, however, that one or more of the raker elements and/or chisel elements could be mounted to the other side of the plate 247.

Although only one cutting device 246 is illustrated, it will be appreciated that a plurality of cutting devices may be provided. For example, two spaced-apart, parallel plates, similar to plate 247, may be provided with chisel elements and raker elements as well.

A shroud 283 is preferably provided on the stump remover 200 so as to cover and surround a major portion of the cutting device 246 and thus provide a safety feature. The shroud 283 is open at the bottom to allow the chisel elements and raker elements to project beyond the shroud. The shroud 283 envelops the cutting device 246 and thus provides a protective shield against flying debris generated during the stump comminution process.

A modification of the embodiment illustrated in FIGS. 18-20 is illustrated in FIGS. 21 and 22. In this particular modification, the stump remover is provided with a shroud 283A which has a configuration similar to that of the shroud 283 described above with reference to the embodiment illustrated in FIGS. 18-20. However, the shroud 283A is pivotally mounted about a pivot pin 285 which is suitably fixed to a portion of the frame or other portion of the frame of the stump remover. The shroud 283A is open at the bottom to allow the chisel elements and raker elements to project beyond the shroud and engage the tree stump. The shroud 283A envelops the cutting device 246 and provides a protective shield against flying debris formed during the stump comminution process.

The shroud 283A is normally maintained in a predetermined position relative to the cutting device 246 by means of a tension spring 287 secured at one end to the top of the shroud 283A and at the other end to the frame or other portion of the stump remover 200. The shroud 283A may be pushed forwardly and downwardly by the operator, against the biasing effect of the spring 287, for sharpening the chisel elements and raker elements with a sharpening means such as sharpening stone 289 that is mounted within the shroud 283A. As illustrated in FIG. 22, the sharpening stone 289 has a plurality of preformed grooves 291 conforming to the contour of a portion of each raker element or chisel element. In lieu of a sharpening stone, sharpening can be effected by a similarly mounted slab of tungsten carbide or industrial diamond particles in a carrier matrix.

For sharpening, the stump remover 200 may be operated without the cutting device engaged with a stump. The shroud 283A is pushed downwardly against the cutting device 246 for contact with, and thus sharpening of, the cutting device raker elements and chisel elements.

The configuration of the cutting device 246 as shown in the two embodiments illustrated in FIGS. 18-22 is also shown in FIGS. 23 and 24 as a modification of the embodiment illustrated in FIGS. 1-6. In particular, the cutting device 46 of the embodiment illustrated in FIGS. 1-6 is replaced with a cutting device 246A having the offset chisel elements 255' and 255" and the raker elements 261 and 262. The elements 255', 255", 261, and 262 are mounted on the opposite side of the plate 247 rather than in the mounting arrangement shown in the embodiments illustrated in FIGS. 18-22. Otherwise, the mounting arrangement and components of the cutting device 246A are the same as in the cutting device 246. The remaining structure and components of the stump remover are the same as in the first embodiment illustrated in FIGS. 1-6.

While particular embodiments of the invention have been shown and described, modifications thereof may be made. It is intended in the appended claims to cover all such modifications as may fall within the true spirit and scope of the invention.

I claim:

1. A portable stump remover, manually movable across a tree stump to effect comminution thereof, and comprising:
   a frame;
   a prime mover mounted to the frame;
   at least one rotatable cutting device with plural chisel elements carried on the frame and operably associated with the prime mover so that the cutting device and the chisel elements thereof are rotated in a circular path by the prime mover; and
   pivot means carried on the frame and adapted to engage the tree stump at a fixed location so that the stump remover is pivotable about the pivot means in a plane substantially parallel to the plane defined by the surface of the tree stump.

2. The portable stump remover in accordance with claim 1 wherein the frame is provided with a rest for supporting the stump remover.

3. The portable stump remover in accordance with claim 2 wherein said pivot means is mounted to said rest.

4. The portable stump remover in accordance with claim 2 wherein said pivot means is rotatably mounted to said rest and is rotatable between an engagement position and a storage position.

5. The portable stump remover in accordance with claim 1 wherein the rotatable cutting device is provided with radially extending and peripherally spaced chisel elements; and
   adjacent chisel elements of the rotatable cutting device are offset in opposite directions.

6. The portable stump remover in accordance with claim 5 wherein a raker element is situated on the rotatable cutting device between each pair of offset chisel elements and is peripherally spaced therefrom.

7. The portable stump remover in accordance with claim 1 wherein a sharpening means is pivotally mounted to said frame and is positionable substantially tangent to the circular path defined by said chisel elements.

8. The portable stump remover in accordance with claim 7 wherein said stump remover includes a biasing means for urging said sharpening means out of engagement with said chisel elements.

9. The portable stump remover in accordance with claim 1 wherein said stump remover includes
   an open ended shroud enveloping said cutting device to provide a guard over the cutting device and a protective shield against flying debris created during the stump comminution process; and
   pivot means for pivotally mounting said shroud to said frame.

10. The stump remover according to claim 1 in which
    said frame includes an arm extending from said prime mover;
    said arm has a distal end region to which said cutting device is mounted; and
    said frame includes means for adjusting the length of said arm.

11. The stump remover in accordance with claim 1 in which
    said cutting device includes a generally disk-like plate;
    said plate defines a plurality of elongate slots extending radially in a spaced-apart array; and said cutting device includes fastener means extending through said slots at selected radial positions for securing said chisel elements to said plate with a selected length of each said chisel element extending beyond the periphery of said plate.

12. A portable stump remover, manually movable across a tree stump to effect comminution thereof, and comprising:

a frame;

a prime mover mounted to the frame; and at least one rotatable cutting device with plural chisel elements carried on the frame and operably associated with the prime mover so that the cutting device and the chisel elements thereof are rotated in a circular path by the prime mover, said cutting device having plurality of peripherally spaced chisel elements, at least one of said chisel elements being laterally offset relative to another of said chisel elements;

said stump remover further including a pair of handles to facilitate manual holding and guiding of the stump remover.

13. The portable stump remover in accordance with claim 12 wherein said cutting device includes a raker element peripherally spaced from said chisel elements.

14. The portable stump remover in accordance with claim 12 wherein a pivot means is carried on the frame for engaging the tree stump at a fixed location so that the stump remover is pivotable about the pivot means in a plane substantially parallel to the plane defined by the surface of the tree stump.

15. The portable stump remover in accordance with claim 14 wherein said frame is provided with a rest for supporting said stump remover and said pivot means is mounted to said rest.

16. The portable stump remover in accordance with claim 15 wherein said pivot means is rotatably mounted to said rest and is rotatable between an engagement position and a storage position.

17. The portable stump remover in accordance with claim 12 wherein at least one pair of adjacent chisel elements of the rotatable cutting device are offset in opposite directions; and at least one radially oriented raker element is provided on said cutting device, said raker element being positioned to lie within the kerf formed by said offset chisel elements.

18. The portable stump remover in accordance with claim 17 wherein said cutting device is rotatable about an axis and wherein one of said raker elements includes a straight member oriented at an oblique angle relative to said axis.

19. The portable stump remover in accordance with claim 12 wherein a sharpening stone is pivotally mounted to said frame and is positionable substantially tangent to the circular path defined by said chisel elements.

20. The portable stump remover in accordance with claim 12 wherein said stump remover includes a biasing means for urging said stone out of engagement with said chisel elements.

21. The portable stump remover in accordance with claim 12 wherein said stump remover includes an open ended shroud enveloping said cutting device to provide a guard over the cutting device and a protective shield against flying debris created during the stump comminution process; and pivot means for pivotally mounting said shroud to said frame.

22. A stump remover according to claim 12 wherein said cutting device is adjustably attached to said frame in order to facilitate adjustment of the cutting depth.

23. A stump remover according to claim 12 including a dead man's switch for manually controlling the operation of said prime mover.

24. A stump remover according to claim 12 wherein said stump remover includes a rotatable shaft carried by said frame, said cutting device is mounted to said shaft, and said stump remover includes a drive belt operatively associated with said shaft and prime mover whereby said prime mover effects rotation of said cutting device by means of said belt.

25. A stump remover according to claim 12 Wherein said chisel elements are removably secured to said cutting device to facilitate replacement of said elements.

26. The stump remover according to claim 12 in which said frame includes an arm extending from said prime mover;

said arm has a distal end region to which said cutting device is mounted; and said frame includes means for adjusting the length of said arm.

27. The stump remover in accordance with claim 12 in which said cutting device includes a generally disk-like plate;

said plate defines a plurality of elongate slots extending radially in a spaced-apart array; and said cutting device includes fastener means extending through said slots at selected radial positions for securing said chisel elements to said plate with a selected length of each said chisel element extending beyond the periphery of said plate.

28. A portable stump remover, manually movable across a tree stump to effect comminution thereof and comprising:

a frame;

a prime mover mounted to the frame;

at least one rotatable cutting device with plural individual grinding elements on a rotatable plate carried on the frame and operably associated with the prime mover so that the cutting device and the individual grinding elements thereof are rotated by the prime mover; and pivot means mounted to the stump remover and adapted to engage the tree stump at a fixed location so that the stump remover is pivotable about the pivot means while the individual grinding elements engage the tree stump.

29. The portable stump remover in accordance with claim 28 wherein said pivot means is rotatably mounted and is rotatable between an engagement position and a storage position.

30. The portable stump remover in accordance with claim 28 wherein a sharpening means is provided on the stump remover for engagement with said individual grinding elements.

* * * * *